(12) United States Patent
Drozd et al.

(10) Patent No.: US 9,149,824 B2
(45) Date of Patent: Oct. 6, 2015

(54) MULTI-COMPONENT PRESSURE TANK ASSEMBLY FOR SPRAY COATING SYSTEMS

(71) Applicant: Finishing Brands Holdings Inc., Minneapolis, MN (US)

(72) Inventors: Mitchell M. Drozd, Harwood Heights, IL (US); Charles John Scott, Batavia, IL (US); Christopher W. Poe, Itasca, IL (US); Eric Ferdinand Reetz, III, Broomfield, CO (US)

(73) Assignee: Carlisle Fluid Technologies, Inc., Charlotte, NC (US)

( * ) Notice: Subject to any disclaimer, the term of this patent is extended or adjusted under 35 U.S.C. 154(b) by 155 days.

(21) Appl. No.: 13/838,435

(22) Filed: Mar. 15, 2013

(65) Prior Publication Data

US 2013/0269807 A1    Oct. 17, 2013

Related U.S. Application Data

(60) Provisional application No. 61/624,941, filed on Apr. 16, 2012.

(51) Int. Cl.
| | |
|---|---|
| *B05B 12/00* | (2006.01) |
| *B05B 7/24* | (2006.01) |
| *B05B 9/04* | (2006.01) |
| *B05B 12/14* | (2006.01) |

(52) U.S. Cl.
CPC ............... *B05B 12/00* (2013.01); *B05B 7/2494* (2013.01); *B05B 7/2497* (2013.01); *B05B 9/04* (2013.01); *B05B 12/1418* (2013.01); *Y10T 137/87153* (2015.04)

(58) Field of Classification Search
CPC ...... B05B 7/2497; B05B 7/2494; B05B 9/04; B05B 12/00; B05B 12/1418

USPC .......... 137/206, 208, 209, 212; 239/303, 304, 239/305, 373; 118/300–326; 222/129, 135, 222/136, 394

See application file for complete search history.

(56) References Cited

U.S. PATENT DOCUMENTS 3,797,744 A * 3/1974 Smith ........................... 239/172
4,526,191 A   7/1985 Pomponi, Jr.
(Continued)

FOREIGN PATENT DOCUMENTS

| EP | 1402957 | 3/2004 |
|---|---|---|
| WO | 2004110643 | 12/2004 |

(Continued)

OTHER PUBLICATIONS

PCT International Search Report for International Application No. PCT/US2013/032863, mailed Jul. 23, 2013.

*Primary Examiner* — Craig Schneider
*Assistant Examiner* — Kevin Barss
(74) *Attorney, Agent, or Firm* — Fletcher Yoder P.C.

(57) ABSTRACT

A system includes a pressure vessel configured to receive a pneumatic flow, and to supply pressurized fluid to a spray coating device. The system also includes a first chamber disposed within the pressure vessel, and configured to store a first fluid, and a second chamber disposed within the pressure vessel, and configured to store a second fluid. Furthermore, the system includes a lid removably coupled to the pressure vessel. The system also includes a first fluid pathway extending through the lid, and configured to deliver the first fluid to the first chamber while the lid is coupled to the pressure vessel. In addition, the system includes a second fluid pathway extending through the lid, and configured to deliver the second fluid to the second chamber while the lid is coupled to the pressure vessel.

19 Claims, 8 Drawing Sheets

(56) References Cited

U.S. PATENT DOCUMENTS

2004/0056045 A1* 3/2004 Kosmyna et al. ............... 222/95
2010/0270394 A1* 10/2010 Kwon ........................... 239/72

FOREIGN PATENT DOCUMENTS

| WO | 2009061074 | 5/2009 |
| WO | 2010044864 | 4/2010 |

* cited by examiner

MULTI-COMPONENT PRESSURE TANK ASSEMBLY FOR SPRAY COATING SYSTEMS

CROSS REFERENCE TO RELATED APPLICATIONS

This application claims priority from and the benefit of U.S. Provisional Application Ser. No. 61/624,941, entitled "Multi-Component Pressure Tank Assembly for Spray Coating Systems", filed Apr. 16, 2012, which is hereby incorporated by reference in its entirety.

BACKGROUND

The invention relates generally to systems for spraying substances, such as coating substances (e.g., paint), and more particularly, to a multi-component pressure tank assembly for spray coating systems.

A variety of spray coating devices may be used to apply a spray to a target object. For example, certain spray coating systems may have a pressurized feed container configured to supply pressurized fluid (e.g., paint) to the spray coating device for generation of a fluid spray. In certain applications, it may be desirable to alternate between fluids (e.g., switch from one color to another). Accordingly, a user may depressurize the feed container, detach the spray coating device, remove a lid of the feed container, empty the fluid from the container, clean the container, and flush the spray coating device with a cleaner (e.g., solvent). The user may then refill the container, replace the lid, reattach the spray coating device, and re-pressurize the feed container. This process is time-consuming and reduces the efficiency of the spray coating process.

BRIEF DESCRIPTION

In one embodiment, a system includes a pressure vessel configured to receive a pneumatic flow, and to supply pressurized fluid to a spray coating device. The system also includes a first chamber disposed within the pressure vessel, and configured to store a first fluid, and a second chamber disposed within the pressure vessel, and configured to store a second fluid. Furthermore, the system includes a lid removably coupled to the pressure vessel. The system also includes a first fluid pathway extending through the lid, and configured to deliver the first fluid to the first chamber while the lid is coupled to the pressure vessel. In addition, the system includes a second fluid pathway extending through the lid, and configured to deliver the second fluid to the second chamber while the lid is coupled to the pressure vessel.

In another embodiment, a system includes a pressure vessel configured to receive a pneumatic flow, and to supply pressurized fluid to a spray coating device. The system also includes a first chamber disposed within the pressure vessel, and configured to store a first fluid, and a second chamber disposed within the pressure vessel, and configured to store a second fluid. At least the second chamber is removably coupled to the pressure vessel. In addition, the system includes a lid removably coupled to the pressure vessel, and a control module configured to mount to the lid. The control module is configured to receive the first fluid from the first chamber and the second fluid from the second chamber, and to selectively provide the first fluid and/or the second fluid to the spray coating device.

In a further embodiment, a system includes a pressure vessel configured to receive a pneumatic flow, and to supply pressurized fluid to a spray coating device. The system also includes a first chamber disposed within the pressure vessel, and configured to store a first fluid, a second chamber disposed within the pressure vessel, and configured to store a second fluid, and a third chamber disposed within the pressure vessel, and configured to store a third fluid. In addition, the system includes a lid removably coupled to the pressure vessel, and a control module configured to mount to the lid. The control module is configured to receive the first fluid from the first chamber and the second fluid from the second chamber, and to selectively provide the first fluid, the second fluid, or a combination thereof, to the spray coating device. The control module is also configured to selectively block flow of the first fluid and the second fluid, and to provide the third fluid from the third chamber to the spray coating device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed in detail below, a spray coating system may include a pressure tank assembly having a pressure vessel configured to receive a pneumatic flow, and to supply pressurized fluid to a spray coating device. In certain embodiments, multiple chambers, each configured to store a respective fluid, are disposed within the pressure vessel. Accordingly, a user may spray multiple fluids without depressurizing the pressure vessel. For example, a first chamber may include a first fluid having a first color, a second chamber may include a second fluid having a second color, and a third chamber may include a solvent. In such a configuration, the user may transition between colors by terminating flow of the first fluid, flushing the spay device with solvent, and then spraying the second fluid. Because the transition between colors is performed without depressurizing the pressure vessel, the duration and labor costs associated with spraying operations may be substantially reduced.

In certain embodiments, the pressure tank assembly includes a lid removably coupled to the pressure vessel, and multiple fluid pathways extending through the lid. The fluid pathways are configured to deliver fluid to the respective chambers while the lid is coupled to the pressure vessel. Accordingly, a user may fill the chambers with additional fluid without removing the lid, thereby reducing the duration associated with replenishing the fluid. In addition, at least one of the chambers may be removably mounted to the pressure vessel, thereby facilitating cleaning and maintenance operations. In further embodiments, the pressure tank assembly includes a control module configured to mount to the lid. The control module is configured to receive a first fluid from a first chamber and a second fluid from a second chamber, and to selectively provide the first fluid and/or the second fluid to the spray coating device. Accordingly, the control module enables the user to spray the first fluid, the second fluid, or a combination of fluids. Furthermore, the control module may be configured to selectively block flow of the first fluid and the second fluid, and to provide a third fluid from a third chamber to the spray coating device. For example, the first fluid may be a resin, the second fluid may be a hardener, and the third fluid may be a solvent. In such a configuration, the control module may be configured to provide a desired resin/hardener ratio during spraying operation. However, when spraying operations are complete, the control module may block flow of the resin and hardener, and flow solvent through the spray coating device, thereby substantially reducing the possibility of deposit formation within the spray coating system.

Figure 1:
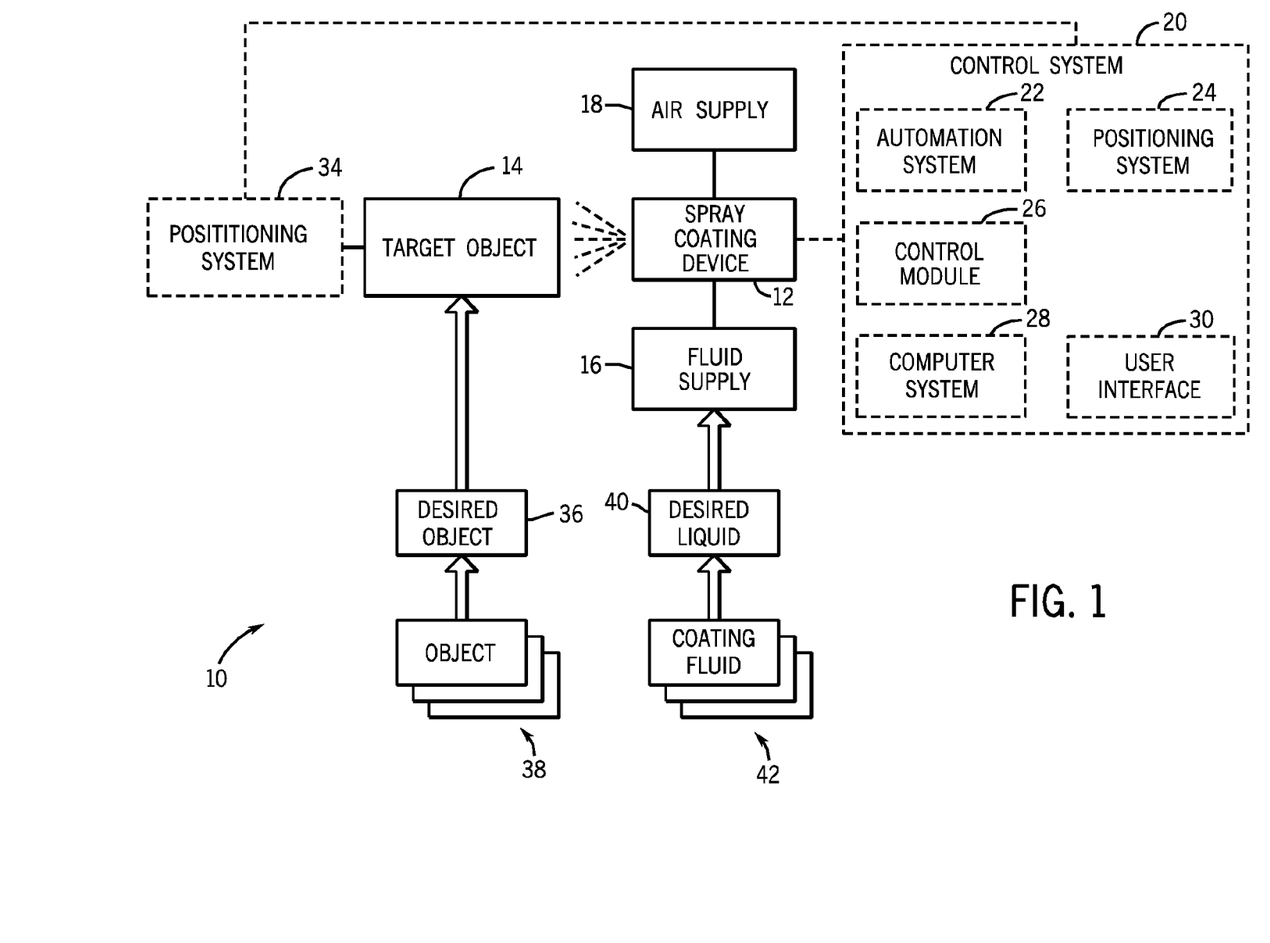
FIG. 1 is a block diagram illustrating an embodiment of a spray coating system.

Turning now to the drawings, FIG. 1 is a block diagram of an embodiment of a spray coating system 10, which includes a spray coating device 12 (e.g., spray device, spray gun). The illustrated spray coating system 10 applies a desired coating fluid to a target object 14. The spray coating device 12 may be coupled to a variety of supply and control systems, such as a fluid supply 16 having a pressure tank assembly, an air supply 18, and a control system 20. The control system 20 facilitates control of the fluid and air supplies 16 and 18 and ensures that the spray coating device 12 provides an acceptable quality spray coating on the target object 14. For example, the control system 20 may include an automation system 22, a positioning system 24, a control module 26, a computer system 28, and a user interface 30. The control system 20 may also be coupled to a positioning system 34, which facilitates movement of the target object 14 relative to the spray coating gun 12. Accordingly, the spray coating system 10 may provide a computer-controlled mixture of coating fluid, fluid and air flow rates, and spray pattern.

The spray coating system 10 of FIG. 1 is applicable to a wide variety of applications, fluids, target objects, and types/configurations of the spray coating device 12. For example, a user may select a desired fluid 40 from a variety of fluids and/or combination of different coating fluids 42, which may include different coating types, colors, textures, and characteristics for a variety of materials such as metal, wood, and plastics. The user also may select a desired object 36 from a variety of different objects 38, such as different material and product types. The spray coating device 12 also may include a variety of different components and spray formation mechanisms to accommodate the target object 14 and fluid supply 16 selected by the user. For example, the spray coating device 12 (e.g., spray gun) may include an air atomizer, a rotary atomizer, an electrostatic atomizer, or any other suitable spray formation mechanism.

Figure 2:
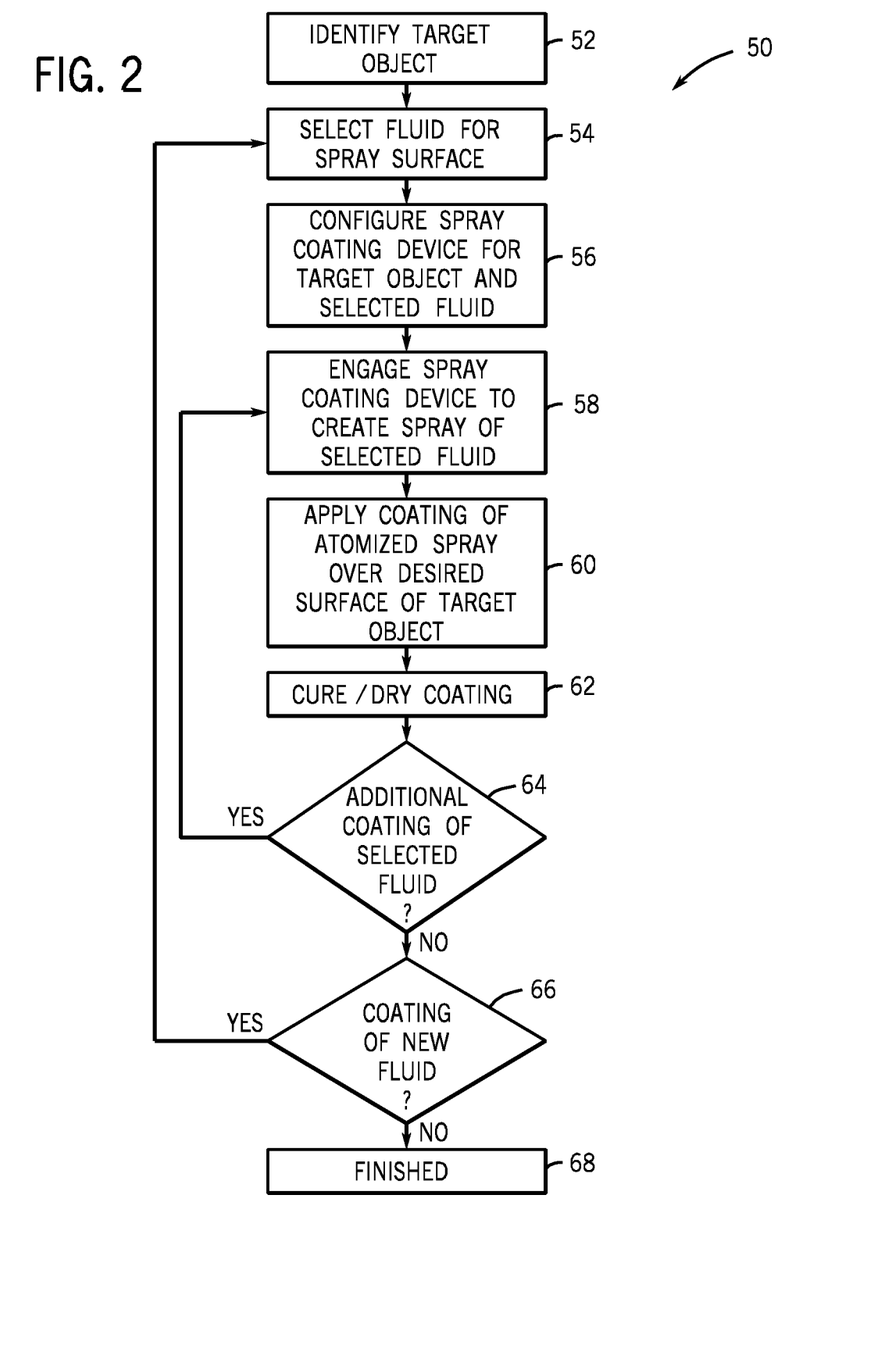
FIG. 2 is a flow chart illustrating an embodiment of a spray coating process.

FIG. 2 is a flow chart of an embodiment of a spray coating process 50 for applying a desired spray coating fluid to the target object 14. As illustrated, the process 50 proceeds by identifying the target object 14 for application of the desired fluid (block 52). The process 50 then proceeds by selecting the desired fluid 40 for application to a spray surface of the target object 14 (block 54). A user may then proceed to configure the spray coating device 12 for the identified target object 14 and desired fluid 40 (block 56). As the user engages the spray coating device 12, the process 50 then proceeds to create an atomized spray of the selected fluid or fluids 40 (block 58). The user may then apply a coating of the atomized spray over the desired surface of the target object 14 (block 60). The process 50 then proceeds to cure/dry the coating applied over the desired surface (block 62). If an additional coating of the selected fluid 40 is desired by the user at query block 64, then the process 50 proceeds through blocks 58, 60, and 62 to provide another coating of the selected fluid 40. If the user does not desire an additional coating of the selected fluid at query block 64, then the process 50 proceeds to query block 66 to determine whether a coating of a new fluid is desired by the user. If the user desires a coating of a new fluid at query block 66, then the process 50 proceeds through blocks 54, 56, 58, 60, 62, and 64 using a new selected fluid for the spray coating. If the user does not desire a coating of a new fluid at query block 66, then the process 50 is finished at block 68.

Figure 3:
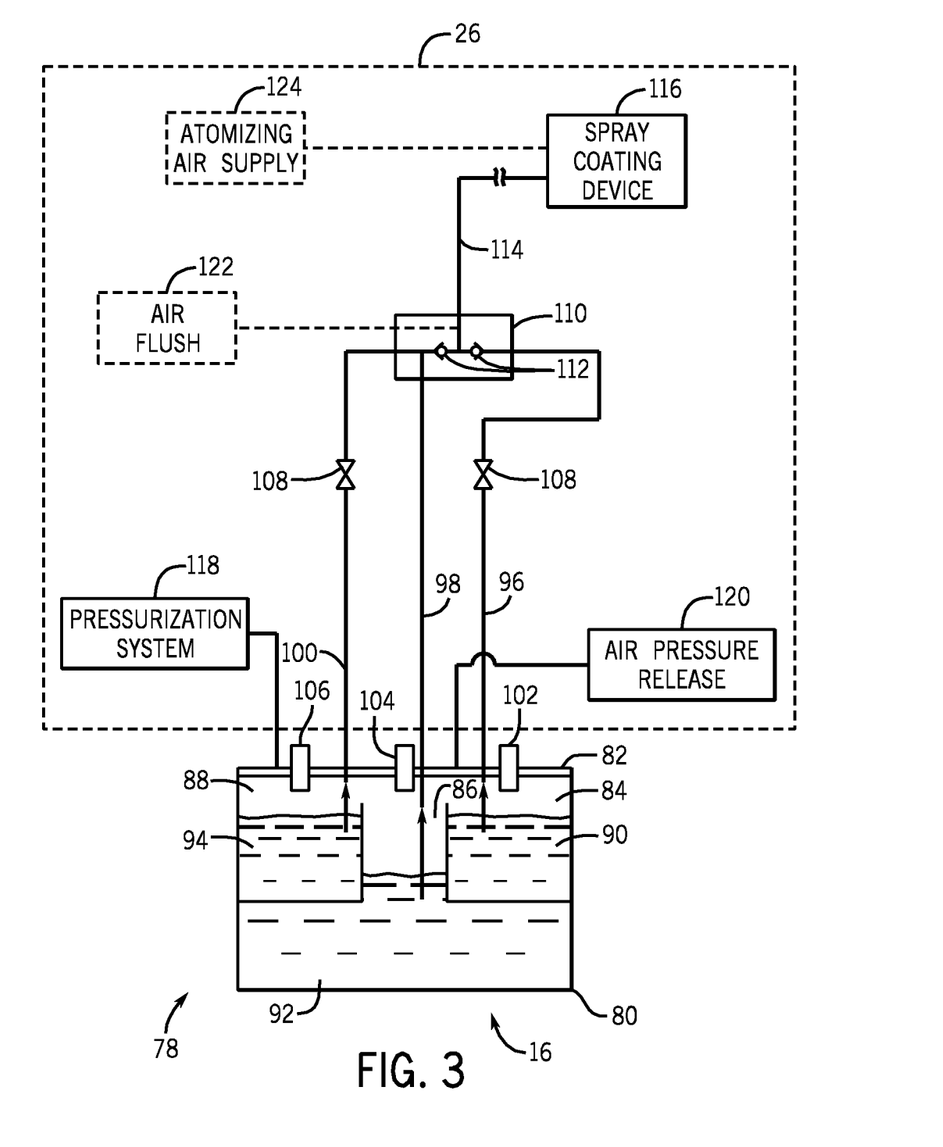
FIG. 3 is a schematic view of an embodiment of a fluid supply system having a pressure tank assembly.

FIG. 3 is a schematic view of an embodiment of a fluid supply system 16 having a pressure tank assembly 78. As illustrated, the pressure tank assembly 78 includes a control module 26, and a pressure vessel 80 having a lid 82. Further, the illustrated embodiment of the pressure tank assembly 78 includes three chambers 84, 86, and 88. However, it should be appreciated that the pressure tank assembly may include 1, 2, 3, 4, 5, or more chambers. In certain embodiments, one or more of the chambers (e.g., chambers 84 and 88) may be removably coupled to the pressure vessel 80. For example, as discussed in detail below, the pressure tank assembly 78 may include a mounting frame configured to be disposed within the pressure vessel 80, and to support at least one removable chamber. In the illustrated embodiment, the chambers 84, 86 and 88 are pressurized by a pneumatic flow into the pressure vessel 80, thereby establishing a substantially equal pressure among the chambers. However, it should be appreciated that certain chambers may be individually pressurized to establish a different pressure within each chamber.

As illustrated, each chamber 84, 86, and 88 is filled with a respective fluid 90, 92, and 94. Specifically, a first fluid 90 is disposed within a first chamber 84, a second fluid 92 is disposed within a second chamber 86, and a third fluid 94 is disposed within a third chamber 88. As will be appreciated, the fluids 90, 92, and 94 may be any type of fluid suitable for spraying, such as paint, epoxy, resin, hardener, foam components, and solvents, for example. Each chamber 84, 86, and 88 includes a respective fluid conduit 96, 98, and 100 configured to withdraw the fluids from the chambers. As illustrated, the fluid conduits 96, 98, and 100 extend from the chambers 84, 86, and 88 through the pressure vessel lid 82, and into the control module 26.

Additionally, the pressure tank assembly 78 includes fluid pathways, such as the illustrated fill ports 102, 104, and 106, to facilitate delivery of a desired fluid into each chamber while the lid 82 is coupled to the pressure vessel 80. For example, a first fill port 102 may be used to fill the first chamber 84 with the first fluid 90, a second fill port 104 may be used to fill the second chamber 86 with the second fluid 92, and a third fill port 106 may be used to fill the third chamber 88 with the third fluid 94. Furthermore, in certain embodiments, each fill port includes an inlet configured to block pneumatic flow through the fill port while the pressure vessel 80 is pressurized. For example, the pressure tank assembly 78 may include removable caps configured to engage respective inlets to block pneumatic flow through the fill ports. In such a configuration, fluid may be added to the chambers by depressurizing the pressure vessel 80, removing the caps, and filling the chambers with additional fluid. Accordingly, fluid may be added to the chambers without removing the lid 82, thereby reducing the duration associated with spraying operations. In alternative embodiments, check valves, removable plugs, or other suitable devices may be utilized to block pneumatic flow through the fill ports while the pressure vessel 80 is pressurized.

In the illustrated embodiment, the control module 26 includes a first valve 108 fluidly coupled to the first fluid conduit 96, and a second valve 108 fluidly coupled to the third fluid conduit 100. The valves 108 are configured to control fluid flow from the first and third chambers into a manifold 110. As illustrated, the manifold 110 is configured to mix fluid from the fluid chambers, and includes valves 112 (e.g., check valves) configured to block flow of the mixed fluid back into the fluid conduits. A fluid line 114 extending from the manifold 110 to a spray coating device 116 is configured to deliver the mixed fluid to the spray coating device 116.

By way of example, the first fluid 90 may be a hardener, the second fluid 92 may be a solvent, and the third fluid 94 may be a resin (e.g., urethane, etc.). Accordingly, during spraying operations, the valves 108 are opened, thereby facilitating flow of each component (hardener, solvent, and resin) into the manifold 110. As illustrated, the resin mixes with the solvent prior to mixing with the hardener. After the fluids are mixed within the manifold 110, the mixed fluid flows through the fluid line 114 to the spray coating device 116. When spraying operations are complete, the valves 108 are closed, thereby blocking flow of resin and hardener. However, solvent continues to flow into the manifold 110, through the fluid line 114, and through the spray coating device 116, thereby cleaning the fluid pathways. Consequently, the possibility of buildup forming within the components of the system 10 are substantially reduced.

In the illustrated embodiment, the pressure tank assembly 78 includes a pressurization system 118 and an air pressure release 120. The pressurization system 118 is configured to provide a pneumatic flow into the pressure vessel 80, thereby pressurizing the chambers. The pressurization system 118 may include an air supply 18, a pressure regulator, valves, hoses, and/or any other elements suitable for pressurizing the pressure vessel 80. The air pressure release 120 is configured to selectively facilitate air flow out of the pressure vessel 80. For example, the air pressure release 120 may include a manual valve to enable a user to depressurize the pressure vessel 80 when desired. In addition, the air pressure release 120 may include an automatic air pressure relief valve configured to automatically open when the tank pressure exceeds a desired value (e.g., 100 psig).

In the illustrated embodiment, the pressure tank assembly 78 includes an air flush system 122 and an atomizing air supply 124. In some embodiments, the air flush system 122 may be omitted from the pressure tank assembly 78 or may be a separate modular unit that may be added to the pressure tank assembly 78. The air flush system 122 may include an air supply, pressure regulator, valves (e.g., check valve, flow control valve, etc.), hoses, and/or any other desired element suitable for providing pressurized air to the manifold 110. For example, when flushing the system 10 with solvent, air from the air flush system 122 may flow concurrently with the solvent to establish a frothy solvent flow, thereby reducing the amount of solvent used to clean the fluid pathways and/or reducing volatile organic compound emission. In certain embodiments, the air flow from the air flush system 122 may be provided by the pressurization system 118. Additionally, the atomizing air supply 124 may supply air to the spray coating device 116 for atomization of the fluid. For example, the spray coating device 116 may apply gas jets toward a fluid stream, thereby breaking up the fluid stream into a fluid spray. In certain embodiments, the spray coating device 116 may include a rotary atomizer, an airless atomizer, an atomization nozzle, or another suitable atomizer configuration. As discussed in detail below, the atomizing air supply 124, the pressurization system 118, and/or the air flush system 122 may use a common air supply.

Figure 4:
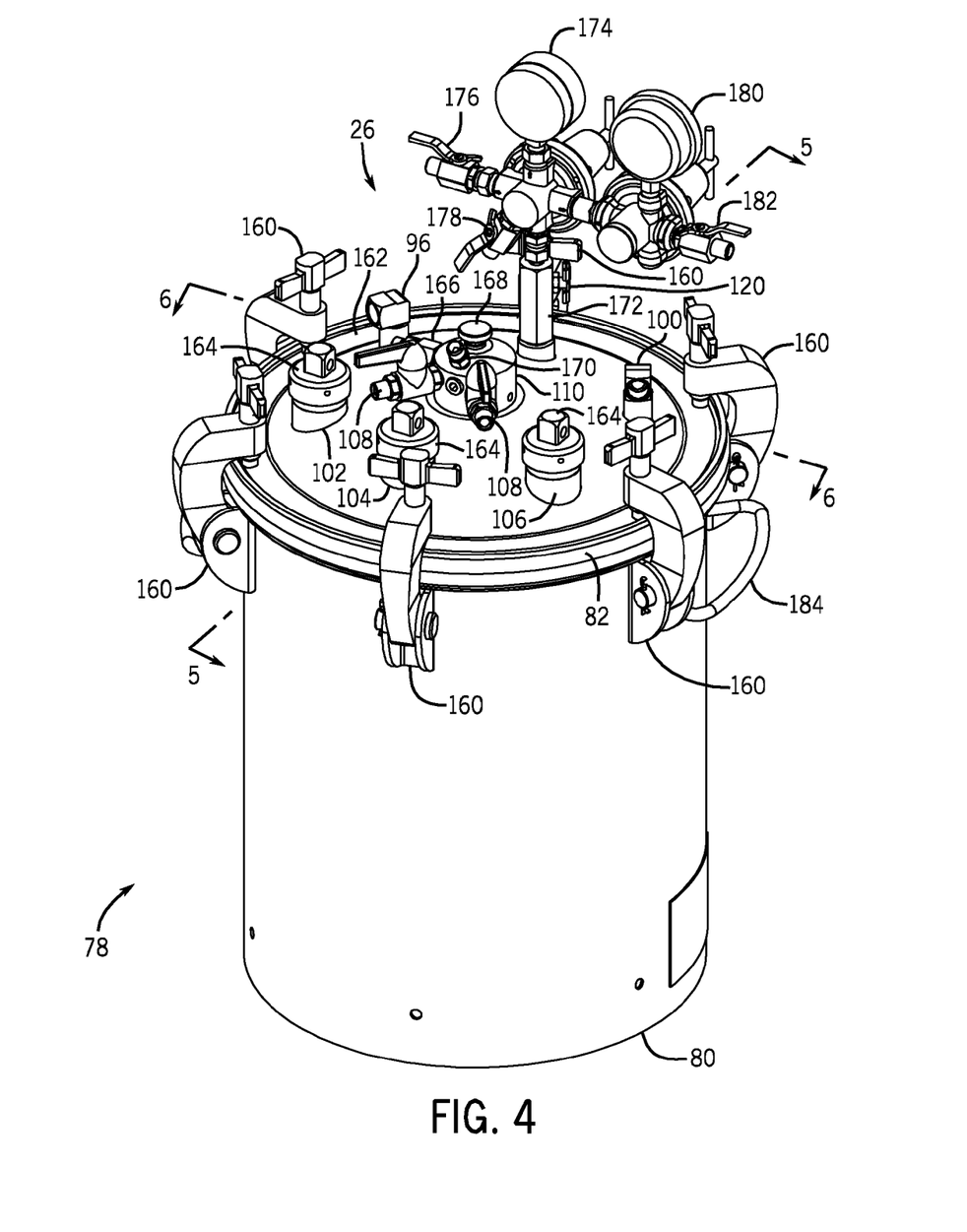
FIG. 4 is a perspective view of an embodiment of a pressure tank assembly that may be employed within the fluid supply system of FIG. 3.

FIG. 4 is a perspective view of an embodiment of a pressure tank assembly 78 that may be employed within the fluid supply system 16 of FIG. 3. As previously discussed, the pressure tank assembly 78 includes the pressure pot 80, the lid 82, and the control module 26. In the illustrated embodiment, the pressure tank assembly 78 includes tank clamps 160 coupled to the pressure vessel 80, and configured to engage a clamp ring 162 of the lid 82. For example, to secure the lid 82 to the pressure vessel 80, the clamps 160 may be rotated into engagement with the clamp ring 162, and then tightened to establish a pneumatic seal between the lid 82 and the pressure vessel 80. Conversely, to remove the lid 82, the clamps 160 may be loosened, and then rotated away from the clamp ring 162. While clamps are employed within the illustrated embodiment, it should be appreciated that other coupling assemblies, such as screws or bolts, may be utilized in alternative embodiments.

In addition, the fill ports 102, 104, and 106 extend through the lid 82. As illustrated, a removable cap 164 is engaged with an inlet of each fill port, thereby blocking pneumatic flow through the fill ports. Similarly, the first and third fluid conduits 96 and 100 extend through the lid 82, and the second fluid conduit 98 extends into the manifold 110. The manifold 110 is coupled to the lid 82, and the valves 108 are coupled to the manifold 110. Each valve 108 may be coupled to a respective fluid conduit via a fluid line (not pictured), such as a hose, pipe, or other suitable coupling. Furthermore, the manifold 110 includes an outlet 170 configured to supply fluid to the fluid line 114. The manifold 110 also includes a check valve 166 for receiving air from the air flush system 122. The check valve 166 is configured to block air/fluid flow from the manifold 110 back into the air flush system 122. Additionally, the manifold 110 includes an air adjustment valve 168 for controlling air flow through the check valve 166. In certain embodiments, the air adjustment valve 168 may be a needle valve, a ball valve, or any other suitable valve configuration.

As illustrated, a pressure conduit 172 is coupled to the lid 82, and configured to supply pressurized air to the pressure tank assembly 78. A tank pressure regulator 174 and the air pressure release 120 are coupled to the pressure conduit 172. In the illustrated embodiment, the air pressure release 120 includes a manual valve. However, in certain embodiments, the air pressure release 120 may include an automatic air pressure relief valve configured to automatically open when the tank pressure exceeds a desired pressure (e.g., 100 psig). In addition, a ball valve 176, a purge air valve 178, and an atomizing regulator 180 are coupled to the tank pressure regulator 174. The tank pressure regulator 174 facilitates user adjustment of air flow into the pressure vessel 80, thereby enabling a desired tank pressure to be established. Additionally, the purge air valve 178 may be fluidly coupled to the check valve 166 to provide air flow for the air flush system 122, as discussed above. Alternatively, a separate air supply may be used to provide air to the air flush system 122. The ball valve 176 may be fluidly coupled to an external air supply to provide air flow into to pressure tank assembly 78. Further, the ball valve 176 is configured to selectively facilitate and block air flow from the external air supply to the pressure vessel 80. The atomization regulator 180 is configured to receive air flow from the tank pressure regulator 174, and to enable a user to adjust the air flow to the spray coating device 116. As illustrated, a ball valve 182 is coupled to the atomization regulator 180, and configured to selectively facilitate and block air flow to the spray coating device 116. Additionally, a transportation section 184 is coupled to the pressure vessel 80. In the illustrated embodiment, the transportation section 184 is a handle. However, in further embodiments, the transportation section 182 may include straps, bolts, wheels, or other suitable devices for transporting the pressure tank assembly 78.

Figure 5:
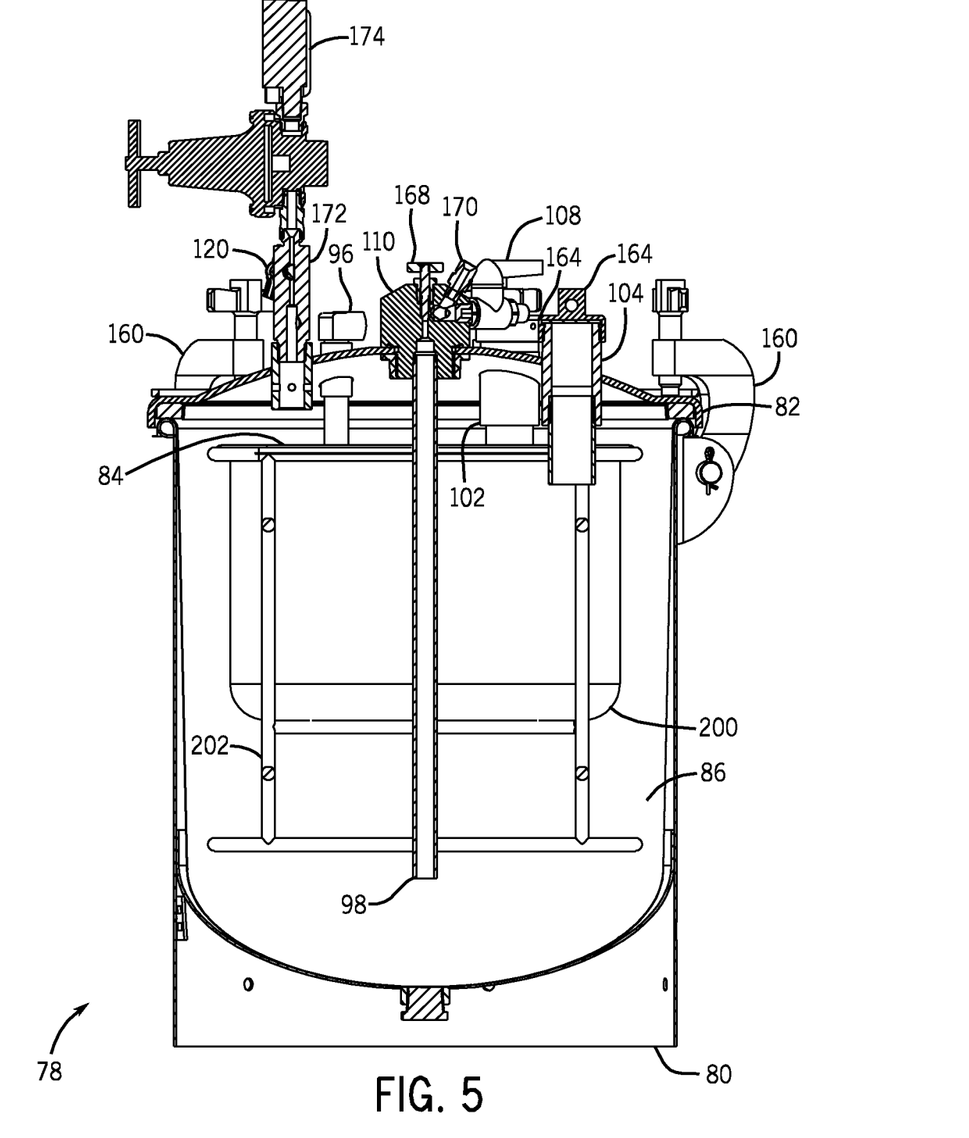
FIG. 5 is a cross-sectional view of the pressure tank assembly of FIG. 3, taken along line 5-5.

FIG. 5 is a cross-sectional view of the pressure tank assembly 78 of FIG. 3, taken along line 5-5. In the illustrated embodiment, a liner 200 forms the first chamber 84. As discussed in detail below, the third chamber 88 may also be formed from a liner. The liner 200 is supported by a mounting frame 202, which is disposed within the pressure vessel 80. While the mounting frame 202 rests against the bottom of the pressure vessel 80 in the illustrated embodiment, it should be appreciated that the mounting frame 202 may be coupled to the pressure vessel 80 via removable couplings, such as screws or bolts, for example. In addition, both the liner 200 and the mounting frame 202 are removable from the pressure vessel 80 to facilitate cleaning and maintenance operations. In the illustrated embodiment, the second chamber 86 is formed within the base of the pressure vessel 80. Accordingly, the second fluid fills the space surrounding the first and third chambers within the pressure vessel 80.

As illustrated, fill ports 102 and 104 pass through the lid 82 to respective chambers 84 and 86. Likewise, fluid conduits 96 and 98 pass through the lid 82 from respective chambers 84 and 86. Further, caps 164 are coupled to the fill ports 102 and 104 to block pneumatic flow out of the pressure vessel 80. As illustrated, the caps 164 are coupled to an exterior surface of the fill ports by a threaded connection. In addition, the manifold 110 is coupled to the valve 108, the outlet 170, and the air adjustment valve 168. As discussed above with reference to FIG. 4, fluid may flow from the first chamber 84, through the first fluid conduit 96 and the valve 108, and into the manifold 110. In addition, fluid may flow from the second chamber 86, through the second fluid conduit 98, and into the manifold 110. Furthermore, the pressure conduit 172 is coupled to the lid 82 to provide pressurization for the pressure vessel 80. The air pressure release 120 (e.g., manual release) is coupled to the pressure conduit 172, as illustrated.

Figure 6:
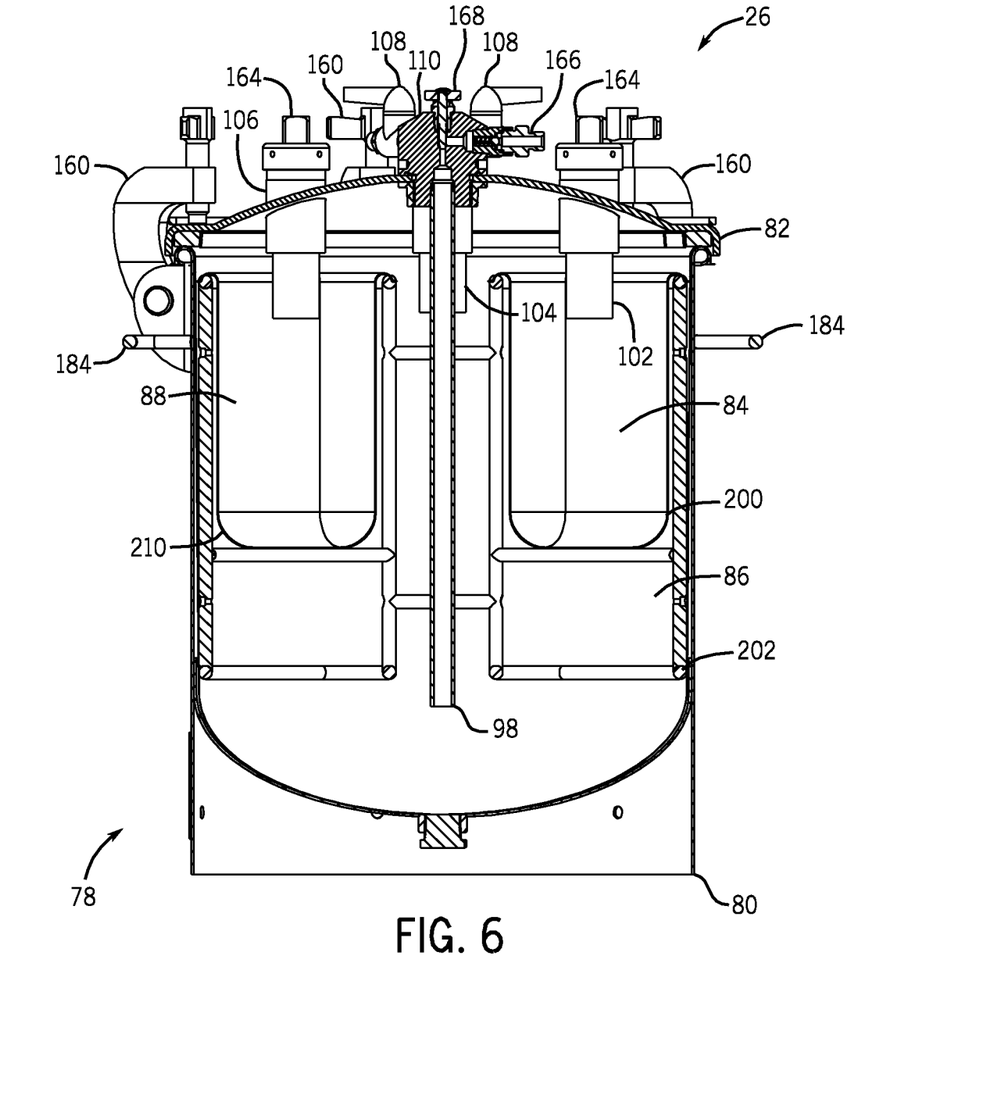
FIG. 6 is another cross-sectional view of the pressure tank assembly of FIG. 3, taken along line 6-6.

FIG. 6 is another cross-sectional view of the pressure tank assembly 78 of FIG. 3, taken along line 6-6. In the illustrated embodiment, the pressure tank assembly 78 includes a first liner 200, which forms the first chamber 84, and a second liner 210, which forms the third chamber 88. As previously discussed, the liners 200 and 210 are removably supported by the mounting frame 202. Further, fill ports 102, 104, and 106 pass through the lid 82 to respective chambers 84, 86, and 88. In addition, the second fluid conduit 98 passes through the lid 82 from the chamber 86 to the manifold 110. As discussed above, the valves 108 are coupled to fluid conduits 96 and 100, and control fluid flow from the chambers 84 and 88 to the manifold 110. The check valve 166 is configured to receive a pneumatic flow for establishing a frothy mixture of solvent, thereby enhancing the efficiency of the flushing process. Additionally, as also discussed above, the pressure vessel 80 is coupled to a transportation section 184, such as the illustrated handles.

Figure 7:
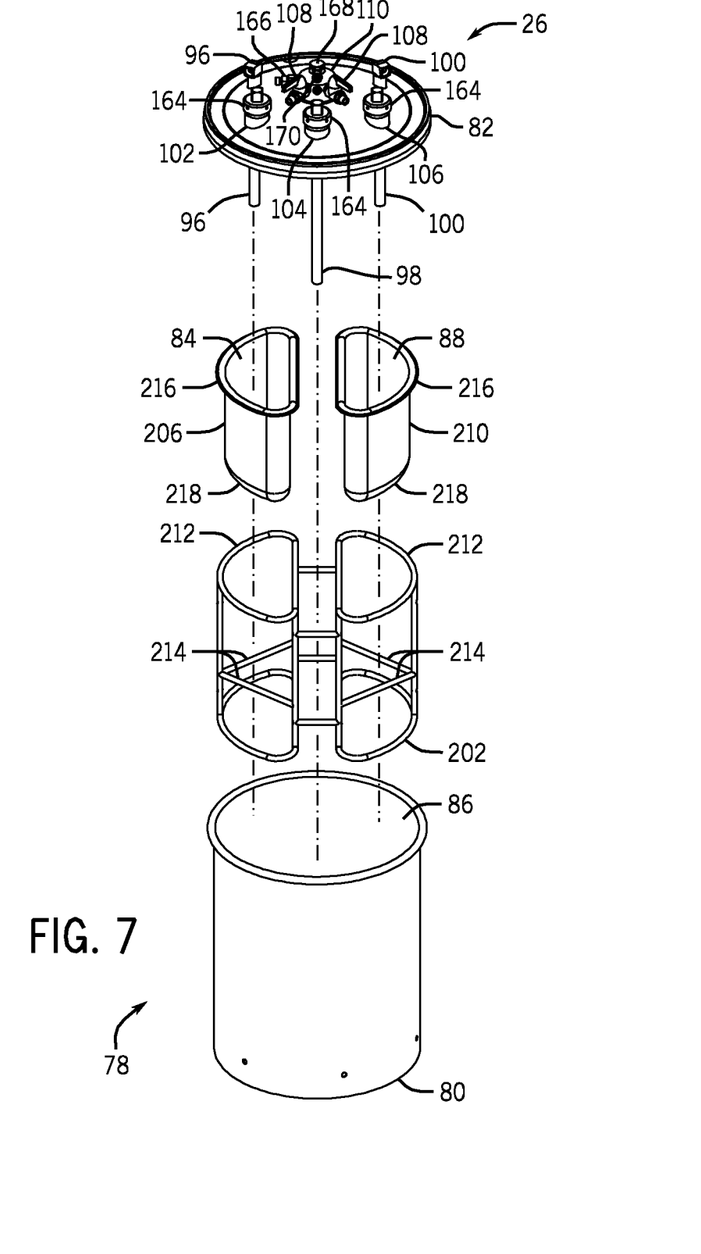
FIG. 7 is an exploded view of the pressure tank assembly of FIG. 3.

FIG. 7 is an exploded view of the pressure tank assembly 78 of FIG. 3. As previously discussed, the lid 82 is configured to couple to the pressure vessel 80, and fill ports 102, 104, and 106 extend through the lid to fill respective chambers 84, 86, and 88. Likewise, fluid conduits 96, 98, and 100 are configured to supply fluid from respective chambers 84, 86, and 88 through the lid 82. Specifically, fluid from the first and third fluid conduits 96 and 100 may pass through the valves 108, and into manifold 110, and fluid from the second conduit 98 may pass directly into the manifold 110. As previously discussed, the check valve 166 and the air adjustment valve 168 may be elements an air flush system 122 configured to provide a frothy solvent flow through the system.

In the illustrated embodiment, the liners 200 and 210 are semi-cylindrical containers configured to store respective fluids. By way of example, a hardener may be disposed within the first liner 200, a resin may be disposed within the second liner 210, and a solvent may fill the space surrounding the liners within the pressure vessel 80. As previously discussed, the mounting frame 202 may be removably placed within the pressure vessel 80 to support the liners 200 and 210. In certain embodiments, the mounting frame 202 may be incorporated as part of the structure of the pressure vessel 80 (e.g., ridges on the inner wall, etc.). In addition, the mounting frame 202 may be coupled to the pressure vessel 80 by screws, bolts, welds, and/or other suitable connectors. In the illustrated embodiment, the mounting frame 202 includes upper liner supports 212 and lower liner supports 214. The upper liner supports 212 are configured to engage respective lips 216 of the liners 200 and 210 to support the liners within the pressure vessel 80. Additionally, each lower liner support 214 supports a respective liner bottom surface 218 to block downward movement of the liners 200 and 210. It should be appreciated that other frame configurations may be employed in alternative embodiments to support the liners 200 and 210.

Figure 8:
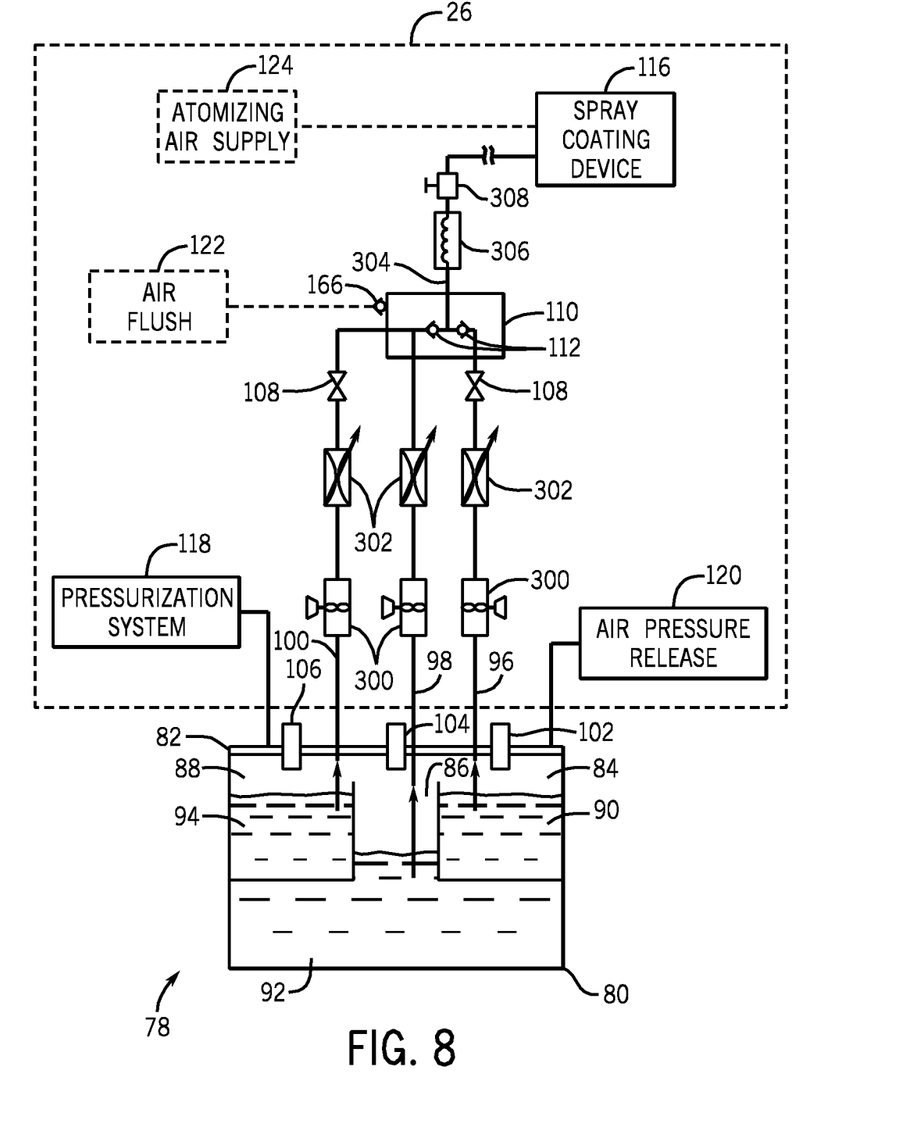
FIG. 8 is a schematic view of an alternative embodiment of a fluid supply system having a pressure tank assembly.

FIG. 8 is a schematic view of an alternative embodiment of a fluid supply system 16 having a pressure tank assembly 78. As illustrated, the fluid conduits 96, 98, and 100 extend from the respective chambers 84, 86, and 88, and pass through the pressure vessel lid 82 into the control module 26. In the illustrated embodiment, the control module 26 includes meter displays 300 configured to measure a fluid flow rate to the spray coating device 116, and flow control valves 302 configured to adjust the fluid flow rate to the spray coating device 116. As illustrated, a meter display 300 and a flow control valve 302 are fluidly coupled to each fluid conduit 96, 98, and 100. Accordingly, a fluid flow rate from each chamber 84, 86, and 88 may be monitored and controller. The fluid conduits 96, 98, and 100 flow fluid into the manifold 110, which mixes the fluids and delivers the mixed fluid to a fluid line 304. A static mixer 306, fluidly coupled to the fluid line 304, further mixes the fluids to enhance the uniformity of the mixture, and/or to agitate the mixture to facilitate chemical reactions. In addition, a flow regulator 308, fluidly coupled to the fluid line 304, facilitates user adjustable control of the fluid flow to the spray coating device 116.

The meter display 300 may be any measurement device appropriate for measuring flow, such as a positive displacement meter. Additionally, the meter display 300 presents fluid flow rate measurements by a suitable device, such as a digital or analog readout. Accordingly, the meter display 300 may enable a user to adjust a fluid flow rate through each conduit (e.g., via the respective flow control valve 302) to achieve a desired flow rate. By way of example, a first color fluid 90 may be disposed within the first chamber 84, a second color fluid 94 may be disposed within the third chamber 88, and a solvent 92 may be disposed within the second chamber 86. By selecting a desired flow rate for the first and second color fluids 90 and 94, a fluid having a desired color may be output to the spray coating device 116, after the first and second color fluids are mixed within the manifold 110 and the static mixer 306. In addition, a flow rate of the solvent 92 may be selected to achieve a desired consistency of the spray fluid. After spraying operations are complete, the user may close the valves 108, thereby blocking fluid flow into the manifold 110. The user may then increase the flow rate of the solvent 92 to flush the system, thereby reducing buildup within the fluid conduits and/or the spray coating device 116.

While the system described above is configured to mix two colors from two chambers, it should be appreciated that alternative embodiments may be configured to mix three or more colors from a corresponding number of chambers. For example, in certain embodiments, the pressure tank assembly may include 1, 2, 3, 4, 5, 6, 7, 8, or more chambers for storing colored fluid. In such embodiments, the control module may be configured to mix the colored fluid from two or more of the chambers to achieve a desired color of the spray fluid. Moreover, while colored fluids are described above, it should be appreciated that other fluids (e.g., resin/hardener) may be disposed within the chambers of the illustrated fluid supply system. Accordingly, the meter displays and the flow control valves may enable the user to provide desired flow rates of the fluids into the manifold, thereby establishing a desired mixture ratio. Furthermore, it should be appreciated that, in certain embodiments, the fluid supply system may be configured to mix three or more fluids from a corresponding number of chambers.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a pressure vessel configured to receive a pneumatic flow, and to supply pressurized fluid to a spray coating device;
a first chamber disposed within the pressure vessel, and configured to store a first fluid;
a second chamber disposed within the first chamber, and configured to store a second fluid;
a lid removably coupled to the pressure vessel;
a first fluid pathway extending through the lid, and configured to deliver the first fluid to the first chamber while the lid is coupled to the pressure vessel, wherein the first fluid pathway includes a first inlet and a first outlet, wherein the first inlet and the first outlet are different from each other;
a second fluid pathway extending through the lid, and configured to deliver the second fluid to the second chamber while the lid is coupled to the pressure vessel, wherein the second fluid pathway includes a second inlet and a second outlet, wherein the second inlet and the second outlet are different from each other.

2. The system of claim 1, wherein the first and second inlets are each configured to block pneumatic flow while the pressure vessel is pressurized.

3. The system of claim 2, comprising a first removable cap configured to engage the first inlet to block pneumatic flow through the first fluid pathway, and a second removable cap configured to engage the second inlet to block pneumatic flow through the second fluid pathway.

4. The system of claim 1, comprising a control module configured to couple to the lid, wherein the control module is configured to receive the first fluid from the first chamber and the second fluid from the second chamber, and to selectively provide the first fluid, the second fluid, or a combination thereof, to the spray coating device.

5. The system of claim 4, wherein the control module includes at least one meter display configured to measure a flow rate of the first fluid or the second fluid to the spray coating device, and at least one flow control valve configured to adjust the flow rate of the first fluid or the second fluid to the spray coating device.

6. The system of claim 4, wherein the control module includes at least one check valve configured to block fluid flow from the spray coating device into the first chamber, the second chamber, or a combination thereof.

7. The system of claim 4, wherein the control module includes at least one static mixer configured to mix the first fluid and the second fluid.

8. The system of claim 1, wherein at least one of the chambers is removable.

9. The system of claim 8, comprising a mounting frame configured to be disposed within the pressure vessel, and to support the at least one removable chamber.

10. A system, comprising:
a pressure vessel configured to receive a pneumatic flow, and to supply pressurized fluid to a spray coating device;
a first chamber disposed within the pressure vessel, and configured to store a first fluid;
a second chamber disposed within the first chamber of the pressure vessel, and configured to store a second fluid, wherein at least the second chamber is removably coupled to the pressure vessel;
a lid removably coupled to the pressure vessel; and
a control module configured to mount to the lid, wherein the control module is configured to receive the first fluid from the first chamber and the second fluid from the second chamber, and to selectively provide the first fluid, the second fluid, or a combination thereof, to the spray coating device.

11. The system of claim 10, comprising:
a first fluid pathway extending through the lid, and configured to deliver the first fluid to the first chamber while the lid is coupled to the pressure vessel; and
a second fluid pathway extending through the lid, and configured to deliver the second fluid to the second chamber while the lid is coupled to the pressure vessel.

12. The system of claim 10, comprising a mounting frame configured to be disposed within the pressure vessel, and to support the second chamber.

13. The system of claim 10, wherein the control module includes at least one meter display configured to measure a flow rate of the first fluid or the second fluid to the spray coating device, and at least one flow control valve configured to adjust the flow rate of the first fluid or the second fluid to the spray coating device.

14. The system of claim 10, wherein the control module includes at least one check valve configured to block fluid flow from the spray coating device into the first chamber, the second chamber, or a combination thereof.

15. The system of claim 10, comprising an air flush system configured to provide a flow of frothy air and solvent to the spray coating device.

16. A system, comprising:
- a pressure vessel configured to receive a pneumatic flow, and to supply pressurized fluid to a spray coating device;
- a first chamber disposed within the pressure vessel, and configured to store a first fluid;
- a second chamber disposed within the pressure vessel, and configured to store a second fluid;
- a third chamber disposed within the pressure vessel, and configured to store a third fluid;
- a lid removably coupled to the pressure vessel;
- a mounting frame disposed within and coupled to the pressure vessel, wherein the mounting frame is configured to support the first chamber, the second chamber, or the third chamber, wherein the mounting frame couples to a vertical wall of the pressure vessel; and
- a control module configured to mount to the lid, wherein the control module is configured to receive the first fluid from the first chamber and the second fluid from the second chamber, and to selectively provide the first fluid, the second fluid, or a combination thereof, to the spray coating device, and wherein the control module is configured to selectively block flow of the first fluid and the second fluid, and to provide the third fluid from the third chamber to the spray coating device.

17. The system of claim 16, wherein at least two of the chambers are removable.

18. The system of claim 16, comprising:
- a first fluid pathway extending through the lid, and configured to deliver the first fluid to the first chamber while the lid is coupled to the pressure vessel;
- a second fluid pathway extending through the lid, and configured to deliver the second fluid to the second chamber while the lid is coupled to the pressure vessel; and
- a third fluid pathway extending through the lid, and configured to deliver the third fluid to the third chamber while the lid is coupled to the pressure vessel.

19. The system of claim 16, wherein the control module includes at least one meter display configured to measure a flow rate of the first fluid or the second fluid to the spray coating device, at least one flow control valve configured to adjust the flow rate of the first fluid or the second fluid to the spray coating device, and at least one static mixer configured to mix the first fluid and the second fluid.

* * * * *